United States Patent
Quatannens et al.

(10) Patent No.: US 12,512,489 B2
(45) Date of Patent: Dec. 30, 2025

(54) EXTERNAL MIXER-EDUCTOR-OXIDIZER AND MODULE CONNECTIONS THEREOF

(71) Applicant: FuelCell Energy, Inc., Danbury, CT (US)

(72) Inventors: Michael L. Quatannens, Danbury, CT (US); Jeffrey Pagani, Danbury, CT (US); William Snyder, Danbury, CT (US)

(73) Assignee: FUELCELL ENERGY, INC, Danbury, CT (US)

( * ) Notice: Subject to any disclaimer, the term of this patent is extended or adjusted under 35 U.S.C. 154(b) by 615 days.

(21) Appl. No.: 16/474,194

(22) PCT Filed: Dec. 28, 2017

(86) PCT No.: PCT/US2017/068770
§ 371 (c)(1),
(2) Date: Jun. 27, 2019

(87) PCT Pub. No.: WO2018/126045
PCT Pub. Date: Jul. 5, 2018

(65) Prior Publication Data
US 2019/0356002 A1 Nov. 21, 2019

Related U.S. Application Data

(60) Provisional application No. 62/440,496, filed on Dec. 30, 2016.

(51) Int. Cl.
*H01M 8/04089* (2016.01)
*H01M 8/04014* (2016.01)
(Continued)

(52) U.S. Cl.
CPC ... *H01M 8/04089* (2013.01); *H01M 8/04022* (2013.01); *H01M 8/04201* (2013.01);
(Continued)

(58) Field of Classification Search
CPC ... H01M 8/2415; H01M 8/2484–2485; H01M 8/04089; H01M 8/04097
See application file for complete search history.

(56) References Cited

U.S. PATENT DOCUMENTS 2,183,071 A   12/1939   Guthrie et al.
9,190,676 B2  11/2015   Snyder et al.
(Continued)

FOREIGN PATENT DOCUMENTS

WO   WO-01/28009 A1      4/2001
WO   WO-2012/040054 A2   3/2012
WO   WO-2015080207 A1 *  6/2015   ............ H01M 8/247

OTHER PUBLICATIONS

International Search Report and Written Opinion in PCT/US2017/068770 dated Mar. 18, 2018 (9 pages).

Primary Examiner — Armindo Carvalho, Jr.
(74) Attorney, Agent, or Firm — Foley & Lardner LLP

(57) ABSTRACT

A fuel cell system includes a fuel cell module having an enclosure configured to house a fuel cell stack that comprises a plurality of fuel cells; and a mixer-eductor-oxidizer that is at least partially external to the enclosure of the fuel cell module, the mixer-eductor-oxidizer being configured to process oxidant supply gas and deliver oxidant gas to a cathode side of the fuel cell stack.

20 Claims, 5 Drawing Sheets

(51) Int. Cl.

| | |
|---|---|
| *H01M 8/04082* | (2016.01) |
| *H01M 8/04701* | (2016.01) |
| *H01M 8/04746* | (2016.01) |
| *H01M 8/12* | (2016.01) |
| *H01M 8/14* | (2006.01) |
| *H01M 8/2484* | (2016.01) |

(52) U.S. Cl.
CPC ... *H01M 8/04708* (2013.01); *H01M 8/04753* (2013.01); *H01M 8/2484* (2016.02); *H01M 2008/1293* (2013.01); *H01M 2008/147* (2013.01)

(56) References Cited

U.S. PATENT DOCUMENTS

| | | |
|---|---|---|
| 2003/0235741 A1 | 12/2003 | Richardson et al. |
| 2004/0005491 A1 | 1/2004 | Blanchet et al. |
| 2004/0121216 A1* | 6/2004 | Blanchet ............... H01M 8/248 |
| | | 429/470 |
| 2006/0035135 A1* | 2/2006 | Patel .................... H01M 8/249 |
| | | 429/513 |
| 2014/0093798 A1* | 4/2014 | Snyder .............. H01M 8/04776 |
| | | 429/417 |
| 2015/0093666 A1 | 4/2015 | Yamamoto et al. |
| 2016/0072146 A1* | 3/2016 | Sridhar ................ H01M 8/244 |
| | | 429/410 |
| 2017/0033394 A1* | 2/2017 | Yamauchi ........... H01M 8/2425 |

\* cited by examiner

EXTERNAL MIXER-EDUCTOR-OXIDIZER AND MODULE CONNECTIONS THEREOF

CROSS-REFERENCE TO RELATED APPLICATIONS

This application claims the benefit of and priority to U.S. Provisional Patent Application No. 62/440,496 filed on Dec. 30, 2016, the entire disclosure of which is incorporated by reference herein.

BACKGROUND

The present disclosure relates to a mixer-eductor-oxidizer that is at least partially external to an enclosure of a fuel cell module and module connections thereof.

In general, a fuel cell includes a negative or anode electrode and a positive or cathode electrode separated by an electrolyte that serves to conduct electrically charged ions between them. A fuel cell will continue to produce electric power as long as fuel and oxidant are supplied to the anode and cathode, respectively. To achieve this, gas flow fields are provided adjacent to the anode and cathode through which fuel and oxidant gas are supplied. In order to produce a useful power level, a number of individual fuel cells are stacked in series with an electrically conductive separator plate between each fuel cell and an adjacent fuel cell.

In high temperature fuel cell stacks, fresh air usually serves as oxidant and is provided at the entry of the cathode-side of the fuel cell stack. This fresh air is typically at ambient temperature and must be heated to the operating temperature of the fuel cell stack. Conventionally, unused fuel in the exhaust gas exiting from the anode-side of the fuel cell stack is oxidized with incoming fresh air to heat the air. In order to ensure complete reaction of fuel and to minimize temperature gradients, the anode-exhaust must be completely mixed with air.

During operation of the fuel cell stack, at a junction of the two process gas streams, gas pressure at the exit of the anode-side of the fuel cell stack is coupled to gas pressure at the inlet of the cathode-side of the fuel cell stack. Typically, the pressure at the exit of the anode-side is necessarily higher than the pressure at the inlet of the cathode-side by an amount required to overcome pressure losses associated with any connection piping and with the oxidizer used to oxidize the anode exhaust and incoming oxidant gases.

An internal mixer-eductor-oxidizer (MEO) has been introduced into fuel cell systems to address both the gas mixing and the pressure differential functional requirements. These fuel cell systems may include molten carbonate fuel cells (MCFC), solid oxide fuel cells (SOFC), or other types of fuel cells. The MEO oxidizes unconverted anode fuel, preheats inlet air, recycles carbon dioxide ($CO_2$) to the cathode, and reduces the pressure difference between the anode and cathode gas streams. In particular, one of the main functions of the MEO is to educt fuel from the fuel cell system to control internal pressure requirements. The MEO may be large. In some fuel cell designs, the size of the MEO makes fitting the MEO inside of the fuel cell infeasible.

A need exists for improved technology related to a mixer-eductor-oxidizer that is at least partially external to an enclosure of a fuel cell module, where the mixer-eductor-oxidize is mounted in a close-coupled configuration to the fuel cell module to minimize a pressure drop and allow space for the mixer-eductor-oxidizer to achieve the required eduction (i.e., creation of vacuum to control internal module pressures).

SUMMARY

In one embodiment, a fuel cell system includes a fuel cell module having an enclosure configured to house a fuel cell stack that comprises a plurality of fuel cells; and a mixer-eductor-oxidizer that is at least partially external to the enclosure of the fuel cell module, the mixer-eductor-oxidizer being configured to process oxidant supply gas and deliver oxidant gas to a cathode side of the fuel cell stack.

In one aspect, the mixer-eductor-oxidizer is completely external to the enclosure of the fuel cell module.

In one aspect, the fuel cell system further includes: a non-bellowed pipe that is not equipped with a bellows, the non-bellowed pipe configured to connect the fuel cell module and the mixer-eductor-oxidizer; and movement means mounted on a bottom surface of the mixer-eductor-oxidizer, the movement means configured to facilitate movement of the mixer-eductor-oxidizer towards and away from the fuel cell module in response to stress on the non-bellowed pipe.

In one aspect, the fuel cell system further includes: a bellowed pipe equipped with a bellows that is configured to compress or extend in response to stress on the bellowed pipe. The bellowed pipe is configured to connect the fuel cell module and the mixer-eductor-oxidizer.

In one aspect, a diameter of the non-bellowed pipe is greater than a diameter of the bellowed pipe.

In one aspect, the non-bellowed pipe is provided closer to a thrust location than the bellowed pipe.

In one aspect, the fuel cell system further includes: an integrated enclosure formed from a plurality of buttresses mounted on an outer surface of the fuel cell module and an outer surface of the mixer-eductor-oxidizer. A strength of the enclosure of the fuel cell module is greater than a strength of an enclosure of the mixer-eductor-oxidizer, and the integrated enclosure is configured to act as a strut such that the enclosure of the fuel cell module is configured to assist in supporting the enclosure of the mixer-eductor-oxidizer.

In one aspect, the fuel cell system further includes: an integrated enclosure formed from a plurality of buttresses mounted on an outer surface of the fuel cell module and an outer surface of the mixer-eductor-oxidizer. A strength of the enclosure of the fuel cell module is less than a strength of an enclosure of the mixer-eductor-oxidizer, and the integrated enclosure is configured to act as a strut such that the enclosure of the mixer-eductor-oxidizer is configured to assist in supporting the enclosure of the fuel cell module.

In one aspect, the non-bellowed pipe and the bellowed pipe are provided within the integrated enclosure.

In one aspect, the fuel cell system further includes: a first stepped nozzle configured to secure a pipe to one of the at fuel cell module or the mixer-eductor-oxidizer.

In one aspect, the first stepped nozzle comprises a plurality of steps, and all of the plurality of steps of the first stepped nozzle project outwards with respect to the enclosure of the fuel cell module or an enclosure of the mixer-eductor-oxidizer.

In one aspect, the first stepped nozzle comprises plurality of steps, and at least one step of the plurality of steps of the first stepped nozzle project inwards with respect to the enclosure of the fuel cell module or an enclosure of the mixer-eductor-oxidizer.

In one aspect, the fuel cell system further includes: a second stepped nozzle including a plurality of steps. The second stepped nozzle is configured to secure an end of the non-bellowed pipe to one of the fuel cell module or the mixer-eductor oxidizer, and at least one of the plurality of steps of the second stepped nozzle is located within the enclosure of the fuel cell module or an enclosure of the mixer-eductor-oxidizer.

In one aspect, the fuel cell system further includes: a third stepped nozzle including a plurality of steps. The third stepped nozzle is configured to secure an end of the bellowed pipe to one of the fuel cell module or the mixer-eductor oxidizer, and at least one of the plurality of steps of the third stepped nozzle is located within the enclosure of the fuel cell module or the enclosure of the mixer-eductor-oxidizer.

In one aspect, the fuel cell system further includes: an additional bellowed pipe equipped with a bellows that is configured to compress or extend in response to stress on the additional bellowed pipe, wherein the additional bellowed pipe is an inlet pipe of the mixer-eductor-oxidizer configured to receive the oxidant supply gas.

In one aspect, the fuel cell system further includes: a recycle blower configured to recycle at least a portion of oxidant exhaust gas output from an outlet of the fuel cell stack, wherein the oxidant supply gas comprises at least a portion of the oxidant exhaust gas.

In one aspect, the oxidant supply gas further comprises fresh air.

In one aspect, the fuel cell system includes one non-bellowed pipe and two or more bellowed pipes.

In one aspect, the fuel cell system includes a plurality of fuel cell modules and a single mixer-eductor-oxidizer connected to each of the fuel cell modules.

In one aspect, the fuel cell system includes a plurality of fuel cell modules and a plurality of mixer-eductor-oxidizers; and one mixer-eductor-oxidizer is connected to each of the fuel cell modules.

In one aspect, the mixer-eductor-oxidizer comprises a mixer/eductor and an oxidizer. The mixer/eductor is configured to mix the oxidant supply gas and anode exhaust gas to form a mixed gas that is reduced in gas pressure and increased in temperature. The oxidizer is configured to oxidize unspent fuel in the mixed gas.

One of ordinary skill in the art would appreciate that the aspects described above are not mutually exclusive and may be combined.

These and other advantageous features will become apparent to those reviewing the disclosure and drawings.

DETAILED DESCRIPTION

Figure 1:
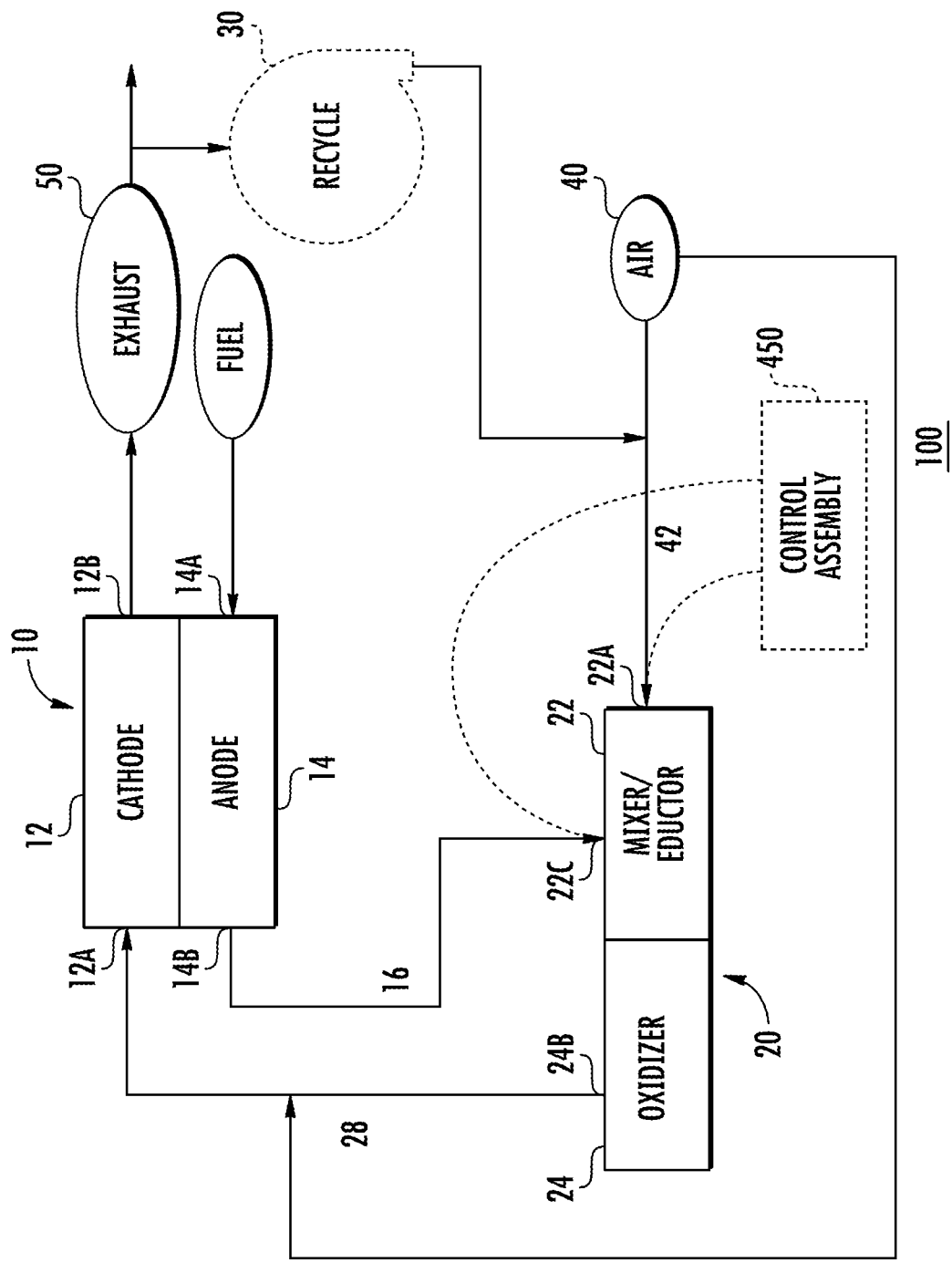
FIG. 1 is a block diagram showing a fuel cell system including a mixer-eductor-oxidizer (MEO).

FIG. 1 is a block diagram showing schematically a fuel cell system 100 that uses a mixer-eductor-oxidizer (MEO). The fuel cell system 100 includes at least one fuel cell 10 that includes anode and cathode sections 14 and 12, respectively, and an external mixer-eductor-oxidizer MEO 20. The fuel cell 10 may be, for example, high-temperature fuel cell such as a Molten Carbonate Fuel Cell (MCFC), which operates at approximately 550-650° C. Although a MCFC is described as an example of the at least one fuel cell 10, the concepts described herein are not limited in this regard. The at least one fuel cell 10 may be any known type of fuel cell, including other high temperature fuel cells (where the cathode gas must be heated to the fuel cell temperature). For example, the at least one fuel cell 10 may be a solid oxide fuel cell.

The fuel cell system 100 optionally includes a recycle blower 30, which may be omitted in some fuel cell systems. The fuel cell system 100 may include a plurality of fuel cells 10 in the form of a fuel cell stack 105, where individual fuel cells 10 are stacked so that fuel and oxidizing gas/air are supplied to the anode and cathode sections, respectively, of the fuel cell stack 105. The fuel cell stacks 105 may be arranged electrically in series or in parallel. At least one fuel cell stack 105 is disposed within a containment or housing unit to form a fuel cell module 110. See, e.g., FIG. 2. The fuel cell system 100 may include one or more fuel cell modules 110.

The MEO 20 processes gases from the at least one fuel cell stack 105 within the fuel cell module 110. In particular, the MEO 20 is configured to process gases from the at least one fuel cell stack 105 and deliver oxidant gas to the cathode sides of the at least one fuel cell stack 105 within the fuel cell module 110.

Figure 2:
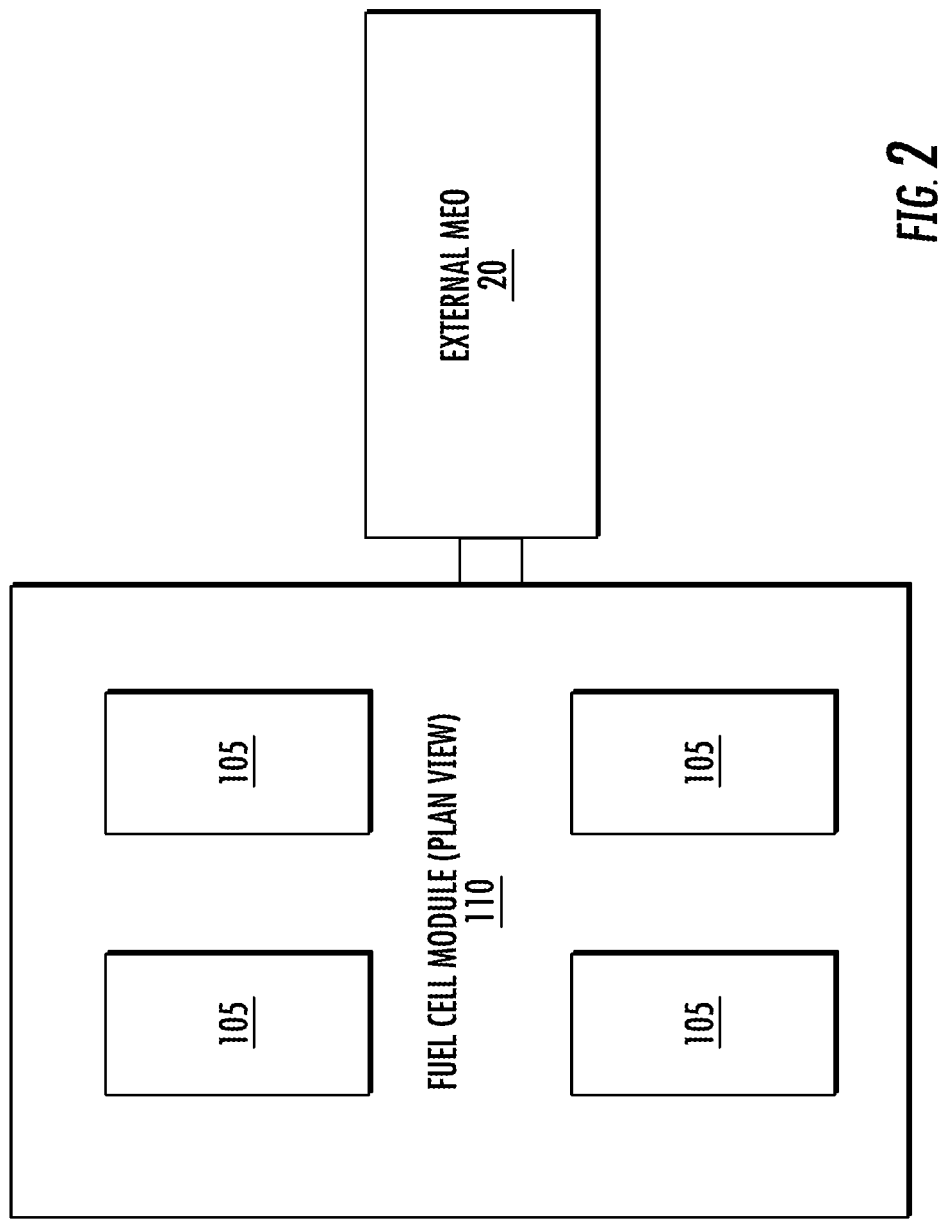
FIG. 2 is a plan view of an external MEO mounted to a surface of a fuel cell module.
Figure 3:
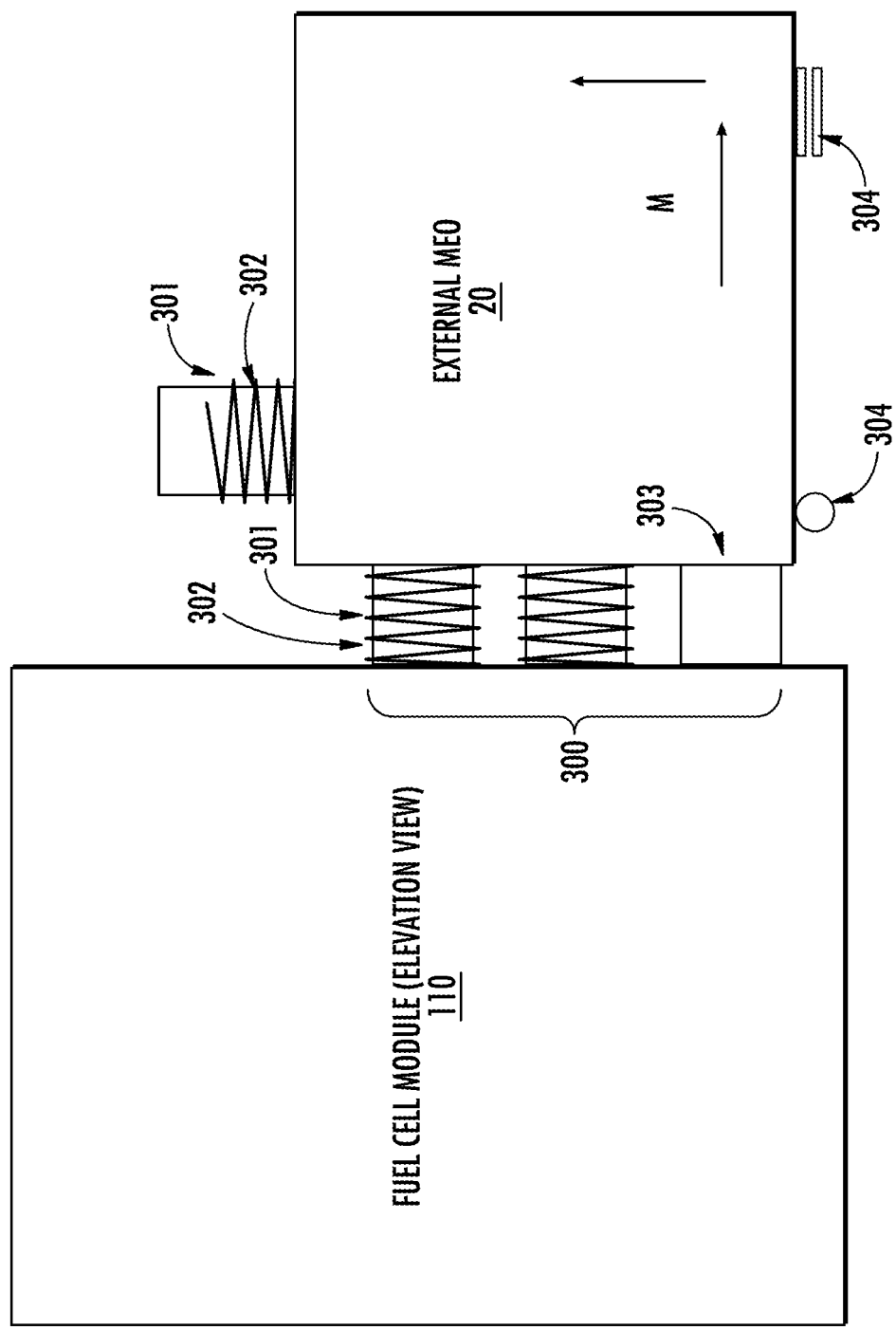
FIG. 3 is an elevation view of a first embodiment in which an external MEO is mounted to a surface of a fuel cell module via at least one pipe having a bellows and at least one solid pipe.
Figure 4:
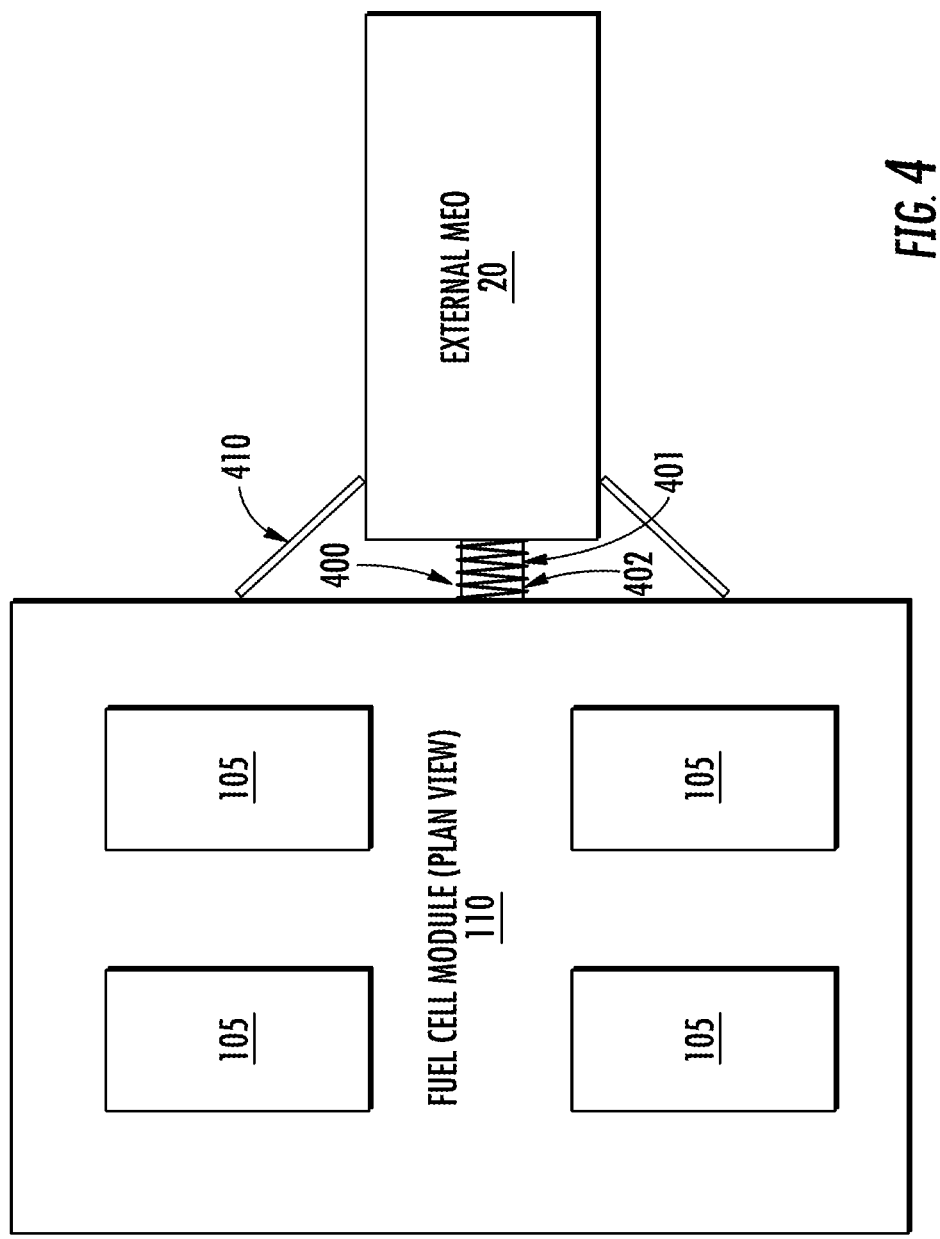
FIG. 4 is a plan view of a second embodiment in which an external MEO is mounted to a front surface of a fuel cell module via at least one pipe having a bellows and an enclosure made of buttresses.

The MEO 20 is an external MEO because it is provided external to the containment or housing unit of the fuel cell module(s) 110. The connections of the MEO 20 to a fuel cell module 110 will be described in further detail below. Although only one fuel cell module 110 and one MEO 20 is illustrated in FIGS. 2-4, the concepts described herein are not limited in this regard. For example, in certain aspects, the fuel cell system 100 includes a plurality of fuel cell modules 110 and/or a plurality of MEOs 20. In a first example, a single MEO 20 may be disposed centrally with respect to a plurality fuel cell modules 110 or in any other predetermined position relative to the fuel cell modules 110 so as to optimize the flow of anode exhaust to the MEO 20 from the fuel cell modules 110 and the flow of oxidant from the MEO 20 to the cathodes of the fuel cell modules 110. In a second example, a plurality of MEOs 20 are provided, where each MEO 20 is configured to processes gases from one or more of the fuel cell modules 110 and deliver oxidant gas to the cathode sides of the one or more of the fuel cell modules 110. In another aspect, a single MEO 20 is connected to each fuel cell module 110. The number of MEOs 20 in the fuel cell system 100 is dependent on the number of fuel cell modules 110 and the gas flow and other requirements.

Referring to FIG. 1, all or a portion of oxidant exhaust gas 50 output from an outlet 12B of the cathode-side section 12 is recycled by the recycle blower 30 and the recycled output 32 alone or in combination with fresh air 40 comprises an oxidant supply gas 42. The oxidant supply gas 42 is fed to an oxidant inlet 22A of the mixer/eductor 22 of the MEO 20. The amount of oxidant exhaust gas 50 recycled by the recycle blower 30 to the MEO 20 and the amount of fresh air 40 mixed with the oxidant exhaust gas 50 is controlled by a controller, which may be part of a control assembly 450 or a separate controller (not shown), so as to achieve desired thermal conditions in the MEO 20 and the fuel cell stack 105. The control assembly 450 is programmed to implement any of the method or control steps described herein. For example, when additional cooling is needed in the MEO 20 and/or in the fuel cell stack 105, the control assembly 450 is programmed to instruct the fuel cell system to supply more fresh air 40 to be mixed with the oxidant exhaust 50, or to use only fresh air 40 as the oxidant supply gas 42 for the MEO 20. Alternatively, if additional heating is needed in the MEO 20 and/or in the fuel cell stack 105, the control assembly 450 is programmed to instruct the fuel cell system to recycle more oxidant exhaust gas 50 to produce the oxidant supply gas 42 and to supply less or no fresh air for the oxidant supply gas.

In examples in which the fuel cell system does not include a recycle blower, the incoming fresh air 40 is heated with an air heater. Typically, in such fuel cell systems, when the fuel cell system is operating at low power, it is necessary to run the air heater to heat the air. However, once the fuel cell system is operating above mid power, there is enough energy in the excess stack fuel to heat the air coming in combined with enough stack heat generation such that it is not necessary to heat the air. The heated air comprises the oxidant supply gas 42 that is fed to the oxidant inlet 22A of the mixer/eductor 22 of the MEO 20.

Each MEO 20 is comprised of a mixer/eductor 22 and an oxidizer 24. When passing through the mixer/eductor 22, the oxidant supply gas 42 entrains anode exhaust gas 16 entering the mixer/eductor 22 via a fuel inlet 22C, and is reduced in gas pressure and increased in temperature. Mixed gases from the mixer/eductor 22 continue into the oxidizer 24, where unspent fuel in the anode exhaust gas of the mixed gases is burned or oxidized, thereby raising the temperature of the gas stream. The outlet gas stream 28 from the MEO 20 is output from an oxidizer outlet 24B and delivered to the cathode inlet 12A of the cathode section 12 (or the cathode side of a fuel cell stack 105), while fuel gas from a fuel gas supply 60 is delivered to the anode inlet 14A of the anode section 14 (or the anode side of a fuel cell stack 105). As shown in FIG. 1, in some embodiments, the outlet gas stream 28 may be mixed with a predetermined amount of fresh air 40 before being supplied to the cathode inlet 12A. The amount of fresh air 40 provided to be mixed with the outlet gas stream 28 is controlled so as to control the temperature of the oxidant gas supplied to the cathode inlet 12A.

Generally, the purposes of the MEO 20 are to oxidize unspent fuel 16 present in the anode exhaust gas output from the anode section 14, to preheat the cathode inlet gas (i.e., the combined outlet gas stream 28 and the fresh air 40, or the outlet gas stream 28 if no fresh air 40 is added), and to reduce the pressure difference between the anode exhaust gas at the outlet 14B of the anode section 14 and the cathode inlet gas at the inlet 12A of the cathode section 12. More specifically, the mixer/eductor 22 ignites and starts oxidizing the unspent fuel and air/oxidant supply gas prior to conveying the mixture through the oxidizer 24. This improves the overall performance of the MEO 20 by reducing condensation of vapors on a catalyst bed of the oxidizer 24 and improving the temperature distribution in the fuel cell system or module. Any known MEO design may be used in the fuel cell system of the present application. For example, U.S. Pat. No. 9,190,676 describes a flame stabilized MEO for high temperature fuel cells. The entire contents of U.S. Pat. No. 9,190,676 are incorporated herein by reference in its entirety for all purposes (including its disclosure related to MEO designs).

The MEO 20, which is partially or fully external to the fuel cell module 110, is in fluid communication with the fuel cell module 110. The MEO 20 must be mounted in a close-coupled configuration to the fuel cell module 110 to minimize a pressure drop, since one of the MEO's main functions is to educt fuel from the fuel cell module 110 to control internal pressure requirements. Referring to FIG. 2, the MEO 20 is mounted on a surface of the fuel cell module 110 (e.g., the front of the fuel cell module 110). Such a configuration minimizes the pressure drop in the fuel cell system 100 and allows space for the MEO 20 to achieve the required eduction (i.e., creation of vacuum to control internal module pressures).

In a fuel cell system, piping expands radially and axially, and a housing of the expands outwards from a center thereof. Expansion of piping is more significant than the expansion of the housing of the MEO. Piping expansion is more significant (problematic) in the axial direction. In other words, an amount of expansion of the housing of the MEO is smaller than an amount of expansion experienced in the pipes. If more than one pipe connects the fuel cell module to the housing of the MEO, then each pipe may have different temperature gases and experience different expansion displacements. To address the expansion issues, pipes with bellows are typically used. However, bellowed pipes are expensive. In particular, the larger the diameter of the bellowed pipe, the more expensive the bellowed pipe.

Referring to FIGS. 3-7, in general, different configurations of module connections may be used to connect the MEO 20 to the fuel cell module.

Referring to FIG. 3, in a first embodiment, a mounting system 300 allows for thermal growth of the MEO 20 to reduce or eliminate the need for at least one large diameter bellowed pipe (e.g., bellows having a diameter larger than 12 inches). The mounting system 300 includes at least one solid pipe 303 (i.e., a non-bellowed pipe) that does not have a bellows and movement means 304. As used herein, the term "solid" refers to the pipe 303 being continuous (i.e., not interrupted by a bellows) along an entire length thereof. The solid pipe 303 is still a hollow pipe having an external diameter and an internal diameter.

As indicated by the arrows M, during operation, the external MEO 20 may move with respect to the fuel cell module 110. For example, the MEO 20 may move horizontally (i.e., towards or away from the fuel cell module 110) and/or vertically (i.e., upwards or downwards). In some examples, the MEO 20 may move approximately one to five centimeters, for example, 2.54 centimeters. To facilitate movement towards and away from the fuel cell module 110 and prevent damage to the fuel cell module 110 and/or the MEO 20, a bottom surface of the MEO 20 optionally includes movement means 304. For example, the movement means 304 may comprise wheels, a roller, a skid design, or any other known structure capable of providing a sliding surface.

The mounting system 300 may further include at least one pipe 301 equipped with an expansion joint 302. The expansion joint 302 may be a bellows (i.e., the at least one pipe 301 may be a bellowed pipe). In some examples, the at least one pipe 301 and/or the solid pipe 303 have a constant diameter. In other examples, the at least one pipe 301 and/or the solid pipe 303 may include a reducer in the pipe run that changes a diameter of the at least one pipe 301 and/or the solid pipe 303. The at least one pipe 301 may be configured to carry different temperature gases or the same temperature gases as the solid pipe 303. The at least one pipe 301 is bellowed to account for differential thermal expansions. The at least one pipe 301 and the solid pipe 303 may have the same or different diameters. For example, a diameter of the at least one pipe 301 may be smaller than a diameter of the solid pipe 303. In examples including multiple pipes, the pipe with the largest diameter may be the solid pipe 303, thereby eliminating the need for at least one bellowed pipe and thus, reducing costs. The solid pipe 303 may be placed closer to the bottom of the MEO 20 than the at least one pipe 301 (see FIG. 3). By placing solid pipe 303 in the bottom location and providing the movement means 304 on a bottom surface of the MEO 20, it is possible to worry less about the effects of the vertical expansion of the housing of the MEO 20 on the solid pipe 303. The remaining pipes, i.e., the at least one pipe 301, are bellowed and can therefore, flex upwards as the MEO 20 expands vertically.

The structure of the bellows 302 is known in the art. In particular, the bellows 302 comprises one or more convolutions configured to withstand an internal pressure of the pipe 301, but flexible enough to allow for axial, lateral, or angular deflection. The bellows 302 preferably exhibits minimal movement, as low movement bellows are associated with a lower cost than large movement bellows. For example, to limit the cost of bellows, it is preferable to limit the movement and size of the bellows. For example, bellows movement may be limited to about ¼". While there is no limit on bellows size, it is preferable to minimize the use of bellows on large pipes (e.g., equal to or larger than a 12-inch diameter). The bellows 302 is configured to compress or extend in response to stresses on the pipe 301 caused, for example, by internal or external pressure at the working temperature of the fuel cell module 110 and the external MEO 20 or thermal expansion. For example, the fuel cell module 110 and the external MEO 20 may operate in a temperature range of 1000-1200° F. at a pressure of 1-3 psi.

Referring to FIG. 3, in one aspect, the mounting system 300 includes three pipes 301 each having a bellows 302, and a single solid pipe 303. Two of the pipes 301 are configured to connect the fuel cell module 110 and the external MEO 20, while one of the pipes 301 is an input pipe configured to receive the oxidant supply gas 42 supplied to the MEO 20. For space considerations, the input pipe 301 extends from a top of the MEO 20, but in other aspects, the input pipe 301 may extend from a different portion of the MEO 20 (e.g., a side surface). The single solid pipe 303 is configured to connect the fuel cell module 110 and the external MEO 20. The two pipes 301 configured to connect the fuel cell module 110 and the external MEO 20 are asymmetric with respect to the single solid pipe 303.

In this example, the fixed location is on the lower left such that when the fuel cell system heats up, growth will move in the opposite direction away from that fixed point (e.g., up and to the right) due thermal growth. The thrust location (the area where movement is zero) may be intentionally placed by fixing a certain location. That is, it has to be deliberately considered in the design case since thermal growth will force movement in all directions away from this point. However, some items (like the housing of the fuel cell module 110) may have small enough temperature gradients where movement is small enough to be neglected. In the case of FIG. 3, the thrust location (point of zero movement) is the location where the solid pipe 303 connects to the fuel cell module 110.

In other aspects, the single solid pipe 303 may be provided between the two pipes 301 configured to connect the fuel cell module 110 and the external MEO 20 (i.e., the two pipes 301 are symmetric with respect to the single solid pipe 303). In even further aspects, a plurality of solid pipes 303 may be provided.

Referring now to FIG. 4 (plan view), in a second embodiment, a mounting system 400 includes an integrated enclosure 410 that completes the structural support for the fuel cell module 110. In some examples, the enclosure 410 is configured to act as a strut such that the housing of the fuel cell module 110 can help support the housing of the MEO 20, allowing the housing of the MEO 20 to have less strength. In other examples, the enclosure 410 is configured to act as a strut such that the housing of the MEO 20 can help support the housing of the fuel cell module 110, allowing the housing of the fuel cell module 110 to have less strength. The enclosure 410 is comprised of buttresses built against an outer surface of the fuel cell module 110 (e.g., a front wall) and an outer surface of the MEO 20. The enclosure 410 is a rigid enclosure, which may be comprised of metal, for example, carbon steel or stainless steel. Any bulging would be on a small scale. For the intents and purposes, this is considered to be "rigid." Therefore, this design would be accompanied by flexible bellows connections for anything internal to the envelope that is buttressed.

The inside of the enclosure 410 includes at least one pipe 401 having a bellows 402. The bellows 402 has the same structure as the bellows 302 described above. Although only one pipe 401 is illustrated in FIG. 4, the concepts described herein are not limited in this regard. A plurality of pipes 401 each having a bellows 302 may be provided within the enclosure 410. Although not illustrated in FIG. 4, an input pipe configured to receive the oxidant supply gas 42 supplied to the MEO 20 is provided outside of the enclosure 410. The input pipe may extend from a top of the MEO 20, as illustrated in FIG. 3, but in other aspects, the input pipe may extend from a different portion of the MEO 20 (e.g., a side surface). A bottom surface of the MEO 20 may include movement means (not illustrated) similar to the movement means 304 of FIG. 3. In the example of FIG. 4, the thrust locations may be the locations where the enclosure 410 is mounted to the fuel cell module 110.

In certain embodiments, aspects of the mounting system 300 of FIG. 3 and the mounting system 400 of FIG. 4 are not mutually exclusive. For example, a mounting system (not illustrated) may be provided that includes at least one pipe equipped with a bellows, at least one solid pipe and an MEO enclosure. The at least one pipe equipped with a bellows and the at least one solid pipe are provided within the MEO enclosure and are configured to connect a fuel cell module and an external MEO. Similar to the mounting system 300 of FIG. 3, the number of pipes with a bellows and solid pipes may be varied. In addition, the physical arrangement of the pipes with a bellows may be varied with respect to a position of the at least one solid pipe.

Figure 5:
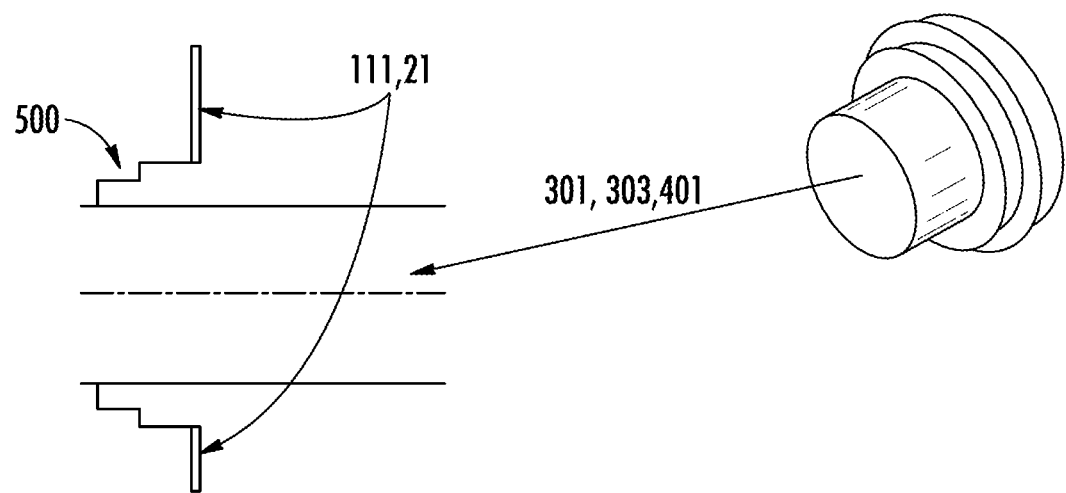
FIG. 5 illustrates an isometric view of a stepped nozzle design (right) and a section view of the stepped nozzle in elevation (left).
Figure 6:
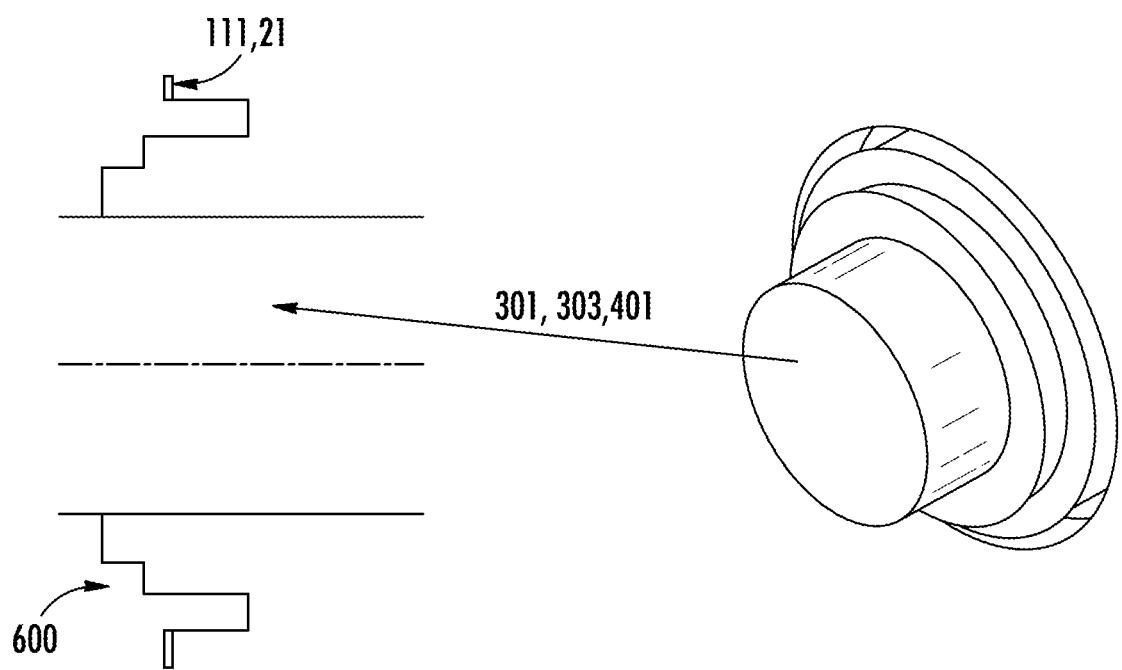
FIG. 6 illustrates an isometric view of a reverse nozzle design (right) and a section view of the reverse nozzle in elevation (left).

Referring to FIG. 5, a stepped nozzle 500 may be used to connect the pipes of FIGS. 3 and 4 to the fuel cell module 110 and/or the MEO 20. Alternatively, a reverse nozzle 600, as illustrated in FIG. 6, may be used to connect the pipes of FIGS. 3 and 4 to the fuel cell module 110 and/or the MEO 20. The nozzle 500 or the reverse nozzle 600 may be provided at only one end of the pipe connected to the fuel cell module, or alternatively, the nozzle 500 or the reverse nozzle 600 may be provided at both ends of the pipe connected to the fuel cell module. In some examples, one end of the pipe may include the nozzle 500 and the other end of the pipe may include the nozzle 600.

The stepped nozzle 500 and the reverse nozzle 600 are both stepped to allow the flexibility needed to accommodate temperature differences between a hot process gas pipe of the fuel cell module 110 and/or the MEO 20 and the cold enclosure of the fuel cell module 110 and/or the MEO 20.

The steps of the stepped nozzle 500 are all external to an enclosure 111 of the fuel cell module 110 and/or an enclosure 21 of the MEO 20 (see FIG. 5). However, with larger diameter pipes, this design would require an excessive amount of axial space.

In contrast, at least one step of the reverse nozzle 600 projects inwards with respect to the enclosure 111 of the fuel cell module 110 and/or the enclosure 21 of the MEO 20 (see FIG. 6). The nozzle 600 has the same function as the nozzle 500, but reduces how far the nozzle protrudes or extends from the enclosure 111 of the fuel cell module 110 and/or the enclosure 21 of the MEO 20 (i.e., the nozzle 600 has a reduced axial length). For example, the reverse nozzle 600 may project inwards with respect to the enclosure 111, 21 by approximately 2-8", thereby reducing how far the nozzle 600 protrudes or extends from the enclosure 111 of the fuel cell module 110 and/or the enclosure 21 of the MEO 20 by the same amount. The use of the reverse nozzle 600 for larger diameter pipes allows for easy access and maintenance of a compact fuel cell module and/or external MEO that does not increase the dimensions of the fuel cell module and/or external MEO. This makes the fuel cell system easier to ship and may reduce shipping costs. The nozzle 600 may be used in any fuel cell system (i.e., is not limited to use in the fuel cell systems illustrated in FIGS. 3 and 4). The nozzle 600 may be used to connect any two elements in the fuel cell system (i.e., it is not limited to use in connecting the fuel cell module 110 and the MEO 20). The nozzle 600 may also be used in any type of system using valve connections for carrying system fluids, gases, etc. between elements of the system (e.g., system piping).

Although in the embodiments described above, the MEO 20 is completely external to the fuel cell module 110, the concepts described herein are not limited in this regard. In certain embodiments, the MEO may be placed in other orientations. For example, some components of the MEO may be placed inside of the fuel cell module, while other components of the MEO may be external to the fuel cell module.

In some aspects, the MEO may be designed using sheet metal fabricated unique components placed inside an internally or externally insulated enclosure.

In other aspects, the MEO may be made of pipes and joints (e.g., elbows) joined together and externally insulated.

In the embodiments described above, provision of a partially external or completely external MEO allows for a more efficient eductor design by creating more space for system piping. In addition, provision of the external MEO allows for adjustments and easy maintenance on the MEO, as compared to a completely internal MEO (i.e., inside of the fuel cell module) that requires the fuel cell module to be disassembled in order to access and maintain the MEO. In addition, any leakage between flow streams will not be exposed directly to the fuel cell system. Moreover, provision of the external MEO minimizes heat loss and cost, as compared to past fuel cell systems which included an external anode gas oxidizer (AGO) (i.e., no eduction part). In these past fuel cell systems, pressure was balanced with an external booster blower, which was expensive to maintain and had reliability limitations. Moreover, the booster blower was positioned such that a lot of piping had to be used. The excess piping and components (e.g., the booster blower) added to the cost of the system and created more surface area for heat loss. In contrast, provision of the external MEO according to the exemplary embodiments described above minimizes heat loss and cost by eliminating the excess piping and components.

Moreover, provision of the external MEO allows for the use of an AGO exit bypass. In some fuel cell systems, there is a need to extract some of the gases downstream of the AGO prior to cooling air 40 being added to the outlet gas stream 28 in FIG. 1. This is referred to as providing an AGO exit bypass because the AGO exit gas is bypassing other system elements to be used for a different purpose. If the MEO is external (as described in the embodiments of the present application), the AGO exit gas is easy to extract. If the MEO is internal, the design of the fuel cell module is more complicated because more internal piping and connections must traverse the enclosure.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described are considered to be within the scope of the exemplary embodiments described above.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the exemplary embodiments described above.

What is claimed is:

1. A fuel cell system comprising:
    a fuel cell module having an enclosure configured to house a plurality of fuel cell stacks, each stack comprising a plurality of fuel cells; and
    a mixer-eductor-oxidizer that is at least partially external to the enclosure of the fuel cell module, the mixer-eductor-oxidizer being configured to process oxidant supply gas and deliver oxidant gas to a cathode side of each fuel cell stack.

2. The fuel cell system of claim 1, wherein the mixer-eductor-oxidizer is completely external to the enclosure of the fuel cell module.

3. The fuel cell system of claim 1, further comprising:
    a non-bellowed pipe that is not equipped with a bellows, the non-bellowed pipe configured to connect the fuel cell module and the mixer-eductor-oxidizer; and
    movement means mounted on a bottom surface of the mixer-eductor-oxidizer, the movement means configured to facilitate horizontal movement of the mixer-eductor-oxidizer in an axial direction of the non-bellowed pipe towards and away from the fuel cell module in response to stress on the non-bellowed pipe.

4. The fuel cell system of claim 3, further comprising:
    a bellowed pipe equipped with a bellows that is configured to compress or extend in response to stress on the bellowed pipe;
    wherein the bellowed pipe is configured to connect the fuel cell module and the mixer-eductor-oxidizer.

5. The fuel cell system of claim 4, wherein a diameter of the non-bellowed pipe is greater than a diameter of the bellowed pipe.

6. The fuel cell system of claim 4, wherein the non-bellowed pipe is provided closer to a thrust location than the bellowed pipe.

7. The fuel cell system of claim 4, further comprising:
    a plurality of buttresses extending outwardly from and coupling an outer front surface of the enclosure of the fuel cell module to an outer surface of the mixer-eductor-oxidizer, thereby forming an integrated enclosure wherein;
    the integrated enclosure is configured to act as a strut such that the enclosure of the fuel cell module is configured to assist in supporting the mixer-eductor-oxidizer.

8. The fuel cell system of claim 4, further comprising:
    a plurality of buttresses extending outwardly from and coupling an outer front surface of the enclosure of the fuel cell module to an outer surface of the mixer-eductor-oxidizer, thereby forming an integrated enclosure, wherein
    the integrated enclosure is configured to act as a strut such that the mixer-eductor-oxidizer is configured to assist in supporting the enclosure of the fuel cell module.

9. The fuel cell system of claim 7, wherein the non-bellowed pipe and the bellowed pipe are provided within the integrated enclosure.

10. The fuel cell system of claim 1, further comprising a stepped nozzle configured to secure a pipe to one of the fuel cell module or the mixer-eductor-oxidizer.

11. The fuel cell system of claim 10, wherein the stepped nozzle comprises a plurality of steps, and wherein at least one step of the plurality of steps projects outwards with respect to a first enclosure and at least one step of the plurality of steps projects inwards with respect to the first enclosure, wherein the first enclosure is one of the enclosure of the fuel cell module or an enclosure of the mixer-eductor-oxidizer.

12. The fuel cell system of claim 11, wherein the step of the plurality of steps having the largest diameter projects inwards with respect to the first enclosure, and one or more steps having smaller diameters project outward with respect to the first enclosure.

13. The fuel cell system of claim 4, further comprising:
    a stepped nozzle including a plurality of steps; wherein:
    the stepped nozzle is configured to secure an end of the non-bellowed pipe to one of the fuel cell module or the mixer-eductor-oxidizer,
    at least one of the plurality of steps of the stepped nozzle is located external to a first enclosure, and
    at least one of the plurality of steps of the stepped nozzle is located within the first enclosure, wherein the first enclosure is one of the enclosure of the fuel cell module or an enclosure of the mixer-eductor-oxidizer.

14. The fuel cell system of claim 13, further comprising:
    an additional stepped nozzle including a plurality of steps; wherein:
    the additional stepped nozzle is configured to secure an end of the bellowed pipe to one of the fuel cell module or the mixer-eductor oxidizer,
    at least one of the plurality of steps of the stepped nozzle is located external to a second enclosure, and
    at least one of the plurality of steps of the additional stepped nozzle is located within the second enclosure, wherein the first enclosure is the other of the enclosure of the fuel cell module or the enclosure of the mixer-eductor-oxidizer.

15. The fuel cell system of claim 4, further comprising an additional bellowed pipe equipped with a bellows that is configured to compress or extend in response to stress on the additional bellowed pipe, wherein the additional bellowed pipe is an inlet pipe of the mixer-eductor-oxidizer configured to receive the oxidant supply gas.

16. The fuel cell system of claim 1, further comprising a recycle blower configured to recycle at least a portion of oxidant exhaust gas output from an outlet of each fuel cell stack, wherein the oxidant supply gas comprises at least a portion of the oxidant exhaust gas.

17. The fuel cell system of claim 4, wherein the fuel cell system includes one non-bellowed pipe and two or more bellowed pipes.

18. The fuel cell system of claim 1, wherein the fuel cell system includes a plurality of fuel cell modules and a single mixer-eductor-oxidizer connected to all of the fuel cell modules, wherein each fuel cell module includes an enclosure configured to house a plurality of fuel cell stacks, each stack comprising a plurality of fuel cells.

19. The fuel cell system of claim 1, wherein:
    the fuel cell system includes a plurality of fuel cell modules and a plurality of mixer-eductor-oxidizers; and
    one mixer-eductor-oxidizer is connected to each of the fuel cell modules.

20. The fuel cell system of claim 1, wherein:
    the mixer-eductor-oxidizer comprises a mixer/eductor and an oxidizer;
    the mixer/eductor is configured to mix the oxidant supply gas and anode exhaust gas to form a mixed gas that is reduced in gas pressure and increased in temperature; and
    the oxidizer is configured to oxidize unspent fuel in the mixed gas.

* * * * *